March 5, 1929.  W. J. LINDSAY  1,704,482
APPARATUS FOR CALCINING LITHOPONE
Original Filed Sept. 21, 1921  2 Sheets-Sheet 1

Inventor
W. J. Lindsay
By his attorney
Chester H. Biesterfeld.

Inventor
W. J. Lindsay
By his attorney
Chester H. Biesterfeld.

Patented Mar. 5, 1929.

1,704,482

UNITED STATES PATENT OFFICE.

WILLIAM J. LINDSAY, OF NORWOOD, PENNSYLVANIA, ASSIGNOR TO E. I. DU PONT DE NEMOURS & COMPANY, OF WILMINGTON, DELAWARE, A CORPORATION OF DELAWARE.

APPARATUS FOR CALCINING LITHOPONE.

Original application filed September 21, 1921, Serial No. 502,101. Divided and this application filed April 20, 1927. Serial No. 185,138.

This invention relates to the manufacture of lithopone and, more particularly, to an apparatus for calcining lithopone.

This application is a division of my co-pending application, Serial No. 502,101, filed September 21, 1921.

In the manufacture of lithopone, one of the important steps is the calcination of the pigment. This is the heating of the "raw", previously filtered, and at least partially dried lithopone, a precipitated mixture of zinc sulphide and barium sulphate, until it is perceptibly red (the color first appears below 600° C.). By the calcination, the tinting strength of the pigment is increased and its oil absorption decreased. (After the proper temperature has been reached in the calcination the pigment is quenched in water.)

For the production of a proper pigment, it is highly important that the zinc sulphide be not oxidized (to zinc sulphate or zinc oxide) and therefore access of oxygen to the pigment during the calcination must be prevented. Also, the pigment must be properly stirred or agitated during the calcination, in order to properly and uniformly heat it, as is evident. And from an operating standpoint, a continuous type of calcining furnace is highly desirable; the continuous, rotary horizontal furnace recommending itself as combining the features of continuous feed, travel, and discharge, and suitable agitation.

But the difficulty is that, except for the present invention, a continuous rotary furnace is not practically usable. Such a furnace cannot be externally heated to the temperatures required in lithopone calcination since the heavy and horizontally disposed iron shell, when exposed to the direct application of the heat, rapidly deteriorates, warps, and so on, while an exterior protective layer of tile or the like is not practical because of the great heat losses it entails. On the other hand, internal heating has not appeared practicable because of the necessity of excluding oxygen. Now I have devised a process of calcining lithopone which can be practiced with, and permits of the use of, a rotary continuous horizontal furnace, with internal heating and exclusion of oxygen; and I have also devised a furnace for the practice of such process. It is the object of the invention to provide such an apparatus. To this end, and also to improve generally upon apparatus of the character indicated, my invention consists in the various matters hereinafter described and claimed.

Briefly stated, the process includes heating the lithopone by the direct application thereto of hot gases which do not contain free oxygen, the heating being carried on in a furnace so constructed as to exclude air, so that, in practical effect, the lithopone is heated by, and in the presence of, an atmosphere containing no free oxygen and, hence, incapable of oxidizing the zinc sulphide. Working in this way, it will be seen that I can heat a furnace internally and at the same time exclude oxygen, making wholly feasible the use of a continuous rotary horizontal furnace. Furthermore, by the direct application of the heat I avoid all those heat losses which, because of the type, occur in any furnace wherein a wall is disposed between the heating gases and the material to be heated; and yet, as will more fully appear hereinafter, I also avoid the contamination of the product, by dust, carbon, etc., which would occur in a grate-fired furnace, while at the same time I maintain the oxygen-free atmosphere which might seem obtainable in a walled furnace with its wall taking a form to provide a lithopone chamber sealed against the admission of oxygen (air).

Without restricting it thereto I describe the invention with more particular reference to the apparatus illustrated in the accompanying drawings, and embodying it as it relates to apparatus. In these drawings:—

Figure 1:
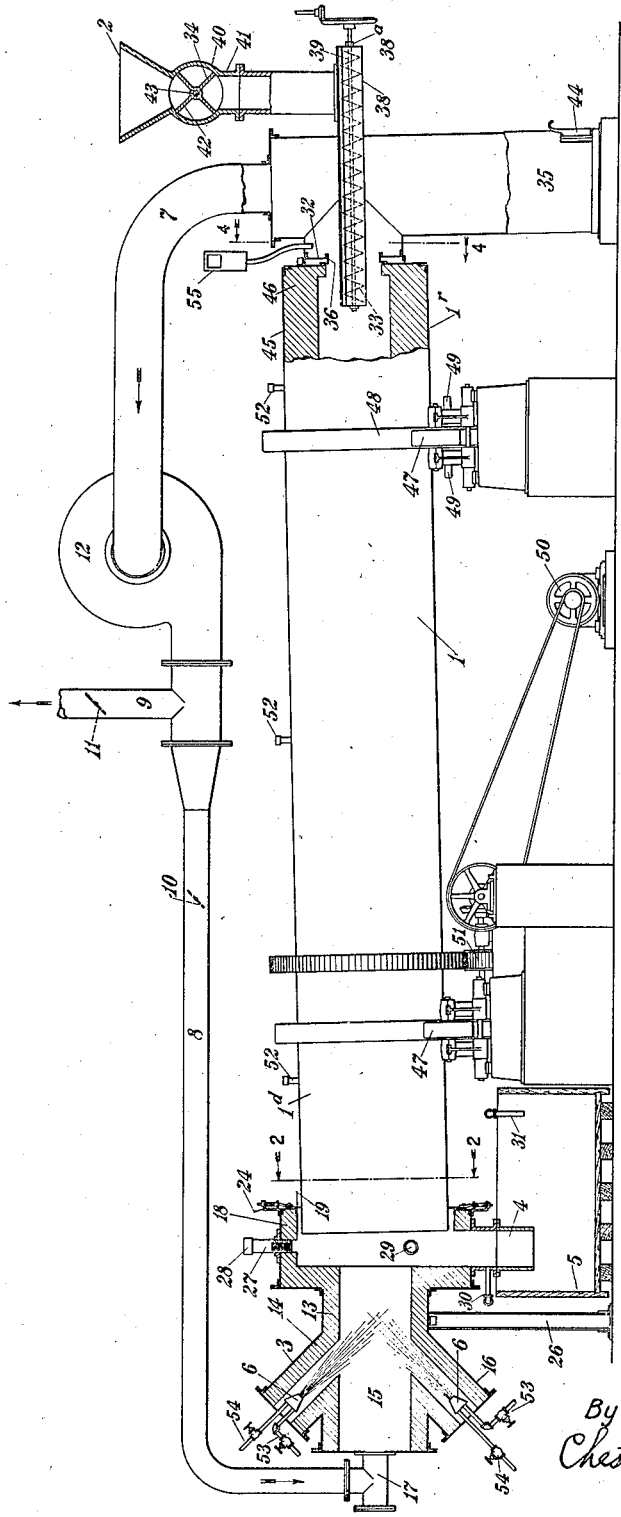
Figure 1 is substantially a diametrical longitudinal sectional view of a continuous rotary horizontal furnace.

Referring now to the drawings, the illustrated furnace comprises a kiln proper, 1, in the general character of cylindrical shell, located in a generally horizontal position, but inclined somewhat downward from right to left (as the same is illustrated in Figure 1) to provide for travel of the lithopone therealong, and mounted for rotation about its longitudinal axis. At one of its ends, $1^r$, the kiln, 1, is connected, in such manner as to practically exclude air while permitting relative rotative movement, with a structure for continuously feeding raw lithopone to the kiln while preventing admission of air, and designated generally as 2. At its other end, $1^d$, the kiln is similarly connected to a combustion-chamber structure designated generally as 3. A discharge pipe, 4, water-sealed by the projection of its open end into the water contained in a tank, 5, provides for the discharge of the calcined lithopone from the kiln. It will be seen that the structure provides for the exclusion of air from the lithopone from the time it is fed into the furnace until after it is cooled. The combustion chamber structure is provided with gas burners, 6—6, shown as broadly of the two-pipe-system type (air and gas supplied under pressure) and, so, permitting accurate adjustment of the air and gas supplies. The structure, 2, is provided with an exit pipe, 7, for the escape of the products of combustion. With this arrangement the lithopone enters the kiln at the end, $1^r$, travels the length thereof, being agitated during the travel by the rotation of the kiln, and discharges at 4, while the hot combustion gases oppositely travel in direct contact with the lithopone and heat the same as required.

In operating in accordance with the process, the supplies of gas and air are so regulated that there is no oxygen supplied in excess of that required to be actually consumed in combustion—preferably, indeed, the supply is such that the combustion gases contain free carbon monoxide, say ½ to 1½%. The furnace connections being, as before indicated, air tight, it will be seen that the calcination is carried on in the absence of free oxygen, the lithopone being heated in an atmosphere comprising no free oxygen, directly by that atmosphere. Thus the process provides for the use of a rotary horizontal kiln, with its advantage of continuous treatment, since it eliminates all difficulties which would arise were it attempted to heat the contents of such a kiln indirectly, i. e., by the application of heating gases to the exterior thereof; and, at the same time, also eliminates the possibility of oxidation of the lithopone.

The gas above-mentioned may be ordinary city gas (that is, an enriched water gas) containing substantial quantities of both hydrogen and carbon monoxide. A typical gas of this kind has the following composition:

$C_{2.5}H_5$ = 8.5% by vol. (50% $C_2H_4$ 50% $C_3H_6$)
$H_2$ = 37.4%
$CH_4$ = 16.2%
$CO$ = 25.8%
$CO_2$ = 5.4%
$O_2$ = 0.8%
$N_2$ = 5.9%

100.0%

A gas of this composition will yield about 500 B. t. u.'s per cubic foot at 21° C.

In carrying out the process the heating conditions are preferably maintained such, and the lithopone fed through the furnace at such a rate that the lithopone is held at a red heat (i. e. above 600° C.) for fifteen minutes or more.

With gas heating, it is, of course, desirable to use those gases which are readily obtainable, such as city gas or producer gas; but the flame temperatures of such gases are so high, say 1500° C., as to give temperatures uncalled for in the calcination. In the present apparatus means are provided for overcoming this difficulty while avoiding the admission of air (oxygen) to the kiln. The exit pipe, 7, for the gases resulting from the combustion is provided with an extension, 8, communicating with the combustion structure, 3, as is shown in Figure 1, and leading from the pipe, 7, adjacent the primary escape, 9, thereof. Valves or dampers, 10 and 11, in the pipes 8 and 9 provide for the adjusting of the amount of gases returned to the system. In operation, such volume of gases as is necessary for proper cooling is circulated through the system, the gases entering the combustion chamber through pipe 8, of course, being cooler than the gases immediately after combustion. These returned gases, of course, contain no oxygen. The gases passing to the stack will, of course, be equal in quantity to the gases formed by the combustion, and the circulating gases may be considered as an amount taken, at some time, from the stack gases and repeatedly circulated through the system.

Desirably, a blower fan 12, driven in a direction to move the gases as above indicated, is inserted in the pipe 7. Thus not only is the desired circulation promoted, and the gases drawn from the kiln, but a slight pressure, for example, approximately two hundredths of an inch of water at the feed end of the kiln, is maintained, thereby obviating possible slight air leakage into the kiln at the connections between the kiln and the structures 2 and 3, and so on.

The combustion chamber structure 3 (desirably of fire brick 13 faced with steel 14)

presents the combustion chamber proper 15. The burners 6 in any suitable number are mounted in chamber extensions 16, and, as before indicated, the pipe 8 is connected with the rear of the chamber at 17.

Figure 2:
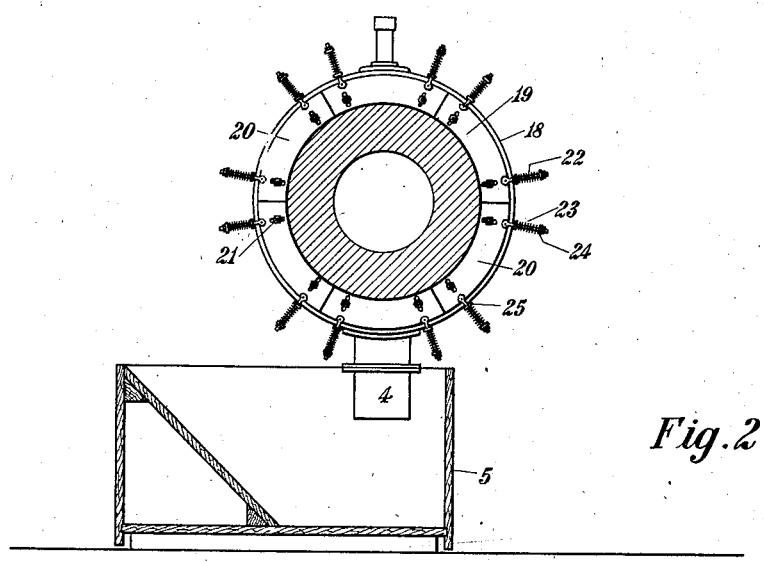
Figure 2 is a cross-sectional view taken substantially on the line 2—2 of Figure 1, looking in the direction of the arrows.

At its forward, or kiln-connected, end the chamber structure 3 has provisions for substantially air-tight connection with the kiln. As shown, the structure is provided with an annular overhanging portion 18, for receiving and closely surrounding the open end 1$^d$ of the cylindrical kiln. To prevent air leakage, a closure, designated generally as 19, is mounted upon the forward edge of the portion 18. This desirably comprises (Fig. 2) a plurality of segments 20 contoured to mate the kiln and slidably connected, by the stud bolts 21, to the face of the portion 18 to be shiftable toward and from the kiln. Conveniently, and as shown, the segments are urged into contact with the kiln by springs 22 each surrounding a rod 23 slidably carried in the bracket 24 (on the portion 18) and connected to the segment, the spring expanding between the bracket and nut 25 on the rod. The chamber structure is conveniently carried on the steel column 26 secured to the floor and the structure.

The before mentioned discharge pipe 4 for calcined lithopone is connected with the portion 18 as shown, and, desirably, a poke hole 27 with a removable cap 28 is provided substantially opposite the pipe 4. If desired, a mica covered peep hole 29, with a suitable cover, may also be provided. Pipes 30 and 31 provide for the introducing of water to, and withdrawal of the same from, the tank 5.

Figure 3:
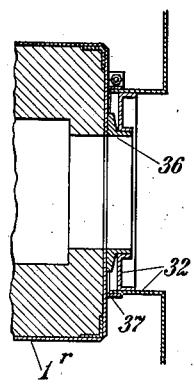
Figure 3 is a fragmental sectional view of the receiving end of the kiln to a somewhat larger scale than Figure 1.
Figure 5:
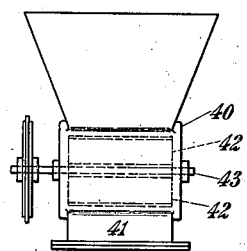
Figure 5 is a partial end view of the furnace, showing the feeding provisions.
Figure 4:
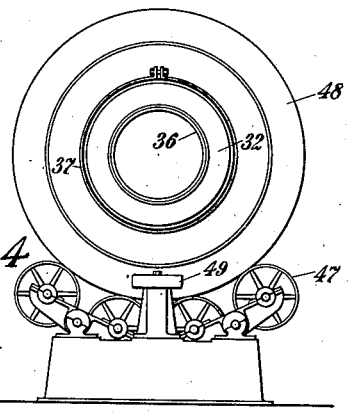
Figure 4 is a view taken substantially at line 4—4 of Figure 1, looking in the direction of the arrows, but with the screw-feed device omitted.

The feeding structure 2 is, conveniently, of steel. The structure includes, in addition to an annular extension or flue portion 32 (Fig. 3) for immediate cooperation with the end 1$^r$ of the kiln (thereby to establish the connection of the kiln with the pipe 7), a feeding device designated generally as 33 and 34 and a dust collector 35. To give practically air-tight connection between the portion 32 and the end 1$^r$ of the kiln, such end is provided with an annular extension or portion 36 closely (but rotatably) receivable within the annular portion 32; and a ring-like clampable band 37 is tightly clamped about the portion 32 close to the end wall of the kiln.

The feeding means 33—34, as here shown, comprises a screw feeder 33 and gas-tight "star" feeder 34. The screw feeder comprises the cylindrical shell 38 within which is the rotatable feed screw 33, the shaft 39 of which is passed, with a suitable stuffing box 38$^a$, air-tight through the end of the shell 38 for connection with a suitable mechanical driving means as an electric motor (not shown). The "star" feeder comprises the "star" 34 rotatably mounted gas-tight in the cylindrical portion 40 of the casing 41. The "star" is made up of the blades 42 radiating from the shaft 43, the blades extending close to the casing and being substantially the length of the cylindrical portion 40. The end of the shaft 43 projects from the casing for suitable connection with a mechanical driving means, as an electric motor (not shown). The shell 38 of the screw feeder, and the lower end of the casing 41 of the star feeder, are in substantially air-tight connection, as shown, whereby the star feeder discharges the lithopone to the screw feeder. A screw feeder with a filling opening directly open to the air is not desirable, while a star feeder cannot readily be directly connected with the rotating kiln. The present arrangement permits the use of the star feeder (with its air-excluding advantages) in combination with the kiln, since it, while obviating the disadvantages of a screw feeder with a directly-open filling opening, utilizes the longitudinal-feed advantage of such a feeder to properly correlate the star feeder and the rotating kiln. Desirably, the two feeders are driven synchronously and continuously, giving the desired continuous air-excluding feed to the kiln.

The dust collector 35 may be of any desired type, being shown merely as a boxlike structure in open communication with the flue 36—32—7 and having a clean out door 44 at its bottom.

The kiln 1 comprises a steel shell 45 lined with fire brick 46. It is rotatably supported at each end by a race of radial rollers 47 and at its upper (right-hand) end the race flange 48, on the kiln, is received between thrust rollers 49, 49. Conveniently, the kiln is driven by an electric motor 50 geared to the kiln as indicated at 51.

Such pyrometer connections as 52, 52, 52, as desired may be provided, for observing the temperatures. The air and gas supply to the burners may be controlled by any desired construction exemplified conventionally by the air valves 53 and gas valves 54, the detailed construction of the burners forming no part of the present invention. For determining the composition of the gases within the kiln, more particularly the amount of carbon monoxide present, a carbon monoxide recorder indicated conventionally at 55 may be used; or, if preferred, a gas escape, for example, in the structure 2, and in the character of a burner may be used, burning of the escaping gas, of course, indicating carbon monoxide, and so on. If desired, automatic control of the air and gas supplies, waste gas circulation, etc., and dependent on the temperature and carbon-monoxide-content changes may be used. Of course, the kiln may be driven in synchronism with the screw and star feeder.

I claim:

1. In a rotary lithopone calcination furnace, in combination, a structure having provisions for gas combustion, a structure having provisions for the feeding of lithopone without access of air to the interior of such structure, a rotary kiln structure located between said two previously named structures, and in open communication therewith to receive combustion gases from the one and lithopone from the other, means connecting said three structures with substantial exclusion of air, and air-excluding lithopone-discharge means associated with said kiln and spaced from the feeding structure, such means being operative to exclude air independently of the lithopone.

2. In a lithopone calcination furnace, in combination, structure presenting a kiln and means for the charging and discharging of lithopone thereto and therefrom, assembled in substantially air-excluding relation, and means providing for the combustion of gas in direct relation with the lithopone charge, such means being of air-excluding character except for provisions for the admission of air for combustion, and including means for the positive regulation of the air supply in relation to the gas supply whereby combustion without excess air may be carried on.

3. In an internally heated rotary lithopone calcination furnace, in combination, a stationary feeding-means-supporting structure, a rotary kiln in material-receiving relation to said structure, an air-excluding feeder mechanism supported by said structure and comprising an enclosed device for feeding the material to be furnaced from said structure to said kiln and an air-excluding feeder for introducing the material to said device, such feeder being assembled in air-tight relation with the enclosing structure of said device, and air-excluding lithopone-discharge means associated with said kiln.

4. In a rotary lithopone calcination furnace, in combination, a stationary feeding-means-supporting structure, a rotary kiln in material-receiving relation to said structure, air-excluding feeder mechanism supported by said structure and comprising a screw-enclosing casing and a rotary feed screw enclosed in said casing and arranged for feeding the material to be furnaced from said structure to said kiln, and also comprising a star feeder, comprising a star and a casing therefor, with such casing assembled in discharging relation to, and in air-tight relation with, the screw-feeder casing, and air-excluding lithopone-discharge means associated with said kiln.

5. In a lithopone calcination furnace, in combination, a combustion structure having controllable provisions for the introduction thereinto and combustion therein, of gas, a calcination chamber in open communication with said combustion structure, and means in addition to and independent of said provisions for the conducting of gas into said structure and chamber, whereby cool inert gas may be introduced to temper the hot combustion gases.

6. In a lithopone calcination furnace, in combination, a combustion structure having provisions for gas firing, combustion-gas-removal structure, and a kiln located between said two structures in communication with both in substantially air-tight relationship, and conducting means connecting said combustion structure and said removal structure for conducting flue gases from said removal structure to said combustion structure, said conducting means being connected with said combustion structure independently of said gas-firing provisions.

7. In a rotary lithopone calcination furnace, in combination, a combustion structure, a combustion-gas-removal structure, a rotary kiln located between said structures in communication with both, and means for connecting each of said structures with said kiln in substantially air-tight relation.

8. In a rotary lithopone calcination furnace, in combination, a rotary kiln having a cylindrical open end, a chambered stationary structure for combustion of heating gases located adjacent said end and having an opening receiving said end and in communication with the chamber of said structure, thereby to place said kiln in communication with said chamber, and means for associating said opening and said kiln end in substantially air-tight relation, such means comprising an annular series of segments surrounding said opening and within the circle of which such series said kiln end is received, said segments being mounted for shifting into contact with said end, and means for urging said segments into such contact.

9. In a rotary lithopone calcination furnace, in combination, a rotary kiln having an end wall with an opening therein and an open extension surrounding said opening and projecting exteriorly beyond said end wall, a chambered stationary structure for combustion of heating gases having a wall with an opening therein in communication with the chamber of such structure, such structure also having an open extension surrounding such opening and projecting exteriorly beyond such wall; said kiln and chambered structure being arranged with their extensions received the one within the other thereby to place said kiln in communication with said chamber; and a clampable ring carried by one of said extensions and shiftable therealong into close relation with the wall having the other extension, thereby to place the kiln and structure in substantially air-tight relation.

10. In a rotary lithopone calcining furnace, in combination, a combustion structure, a rotary kiln structure and a structure presenting lithopone-feeding means and combustion-gas-removal means, said three structures being closely assembled and joined each with the other to present a substantially closed assembly, and means for creating excess gas pressure within said assembly thereby to prevent leakage into the interior of said assembly, from the exterior thereof, at the points of connection of the various structures.

In testimony whereof I affix my signature.

WILLIAM J. LINDSAY.